United States Patent
Craze

[11] Patent Number: 5,640,938
[45] Date of Patent: Jun. 24, 1997

[54] ROTARY ENGINE WITH POST COMPRESSION MAGAZINE

[76] Inventor: Franklin D. Craze, 420 Keystone Cir., Fort Mill, S.C. 29715

[21] Appl. No.: 564,814

[22] Filed: Nov. 29, 1995

[51] Int. Cl.⁶ .................................................. F02B 53/00
[52] U.S. Cl. ........................ 123/222; 123/236; 418/255
[58] Field of Search ............................ 123/222, 236; 418/255

[56] References Cited

U.S. PATENT DOCUMENTS

| | | | |
|---|---|---|---|
| 1,228,806 | 6/1917 | Morris | 123/222 |
| 1,922,363 | 8/1933 | Hapkins . | |
| 2,158,532 | 5/1939 | Bullen | 123/236 |
| 2,174,664 | 10/1939 | Korany . | |
| 2,298,525 | 10/1942 | Briggs . | |
| 2,302,254 | 11/1942 | Rhine . | |
| 2,373,304 | 4/1945 | Garbeth | 123/222 |
| 2,452,471 | 10/1948 | Jones | 418/255 |
| 2,771,860 | 11/1956 | Falk . | |
| 2,864,346 | 12/1958 | Taylor, Jr. . | |
| 3,176,665 | 4/1965 | Macarrulla . | |
| 3,215,129 | 11/1965 | Johnson | 123/222 |
| 3,313,155 | 4/1967 | Erickson | 418/255 |
| 3,452,725 | 7/1969 | Kelly . | |
| 3,743,451 | 7/1973 | Chapman . | |
| 3,765,379 | 10/1973 | Thomas . | |
| 3,929,105 | 12/1975 | Chisholm . | |
| 3,951,112 | 4/1976 | Hunter . | |
| 4,018,191 | 4/1977 | Lloyd . | |
| 4,134,382 | 1/1979 | Southard . | |
| 4,202,313 | 5/1980 | Rosaen . | |
| 4,353,337 | 10/1982 | Rosaen . | |
| 5,072,705 | 12/1991 | Overman . | |
| 5,181,490 | 1/1993 | Ruzic . | |

FOREIGN PATENT DOCUMENTS

| | | | |
|---|---|---|---|
| 1302333 | 7/1962 | France | 123/222 |
| 2525363 | 12/1975 | Germany | 123/222 |

*Primary Examiner*—Michael Koczo
*Attorney, Agent, or Firm*—Shefte, Pinckney & Sawyer

[57] ABSTRACT

A rotary internal combustion engine includes a housing having a separate compression chamber and power chamber formed therein with a fuel and air mixture reservoir disposed intermediate the two chambers. A plenum chamber is disposed in the housing intermediate the power chamber and the fuel and air mixture reservoir with a rotating impeller disposed therein forming a magazine which rotates synchronously with the rotors to deliver compressed volumes of fuel and air mixture into the power chamber for enhanced power delivery capabilities.

23 Claims, 4 Drawing Sheets

ROTARY ENGINE WITH POST COMPRESSION MAGAZINE

BACKGROUND OF THE INVENTION

The present invention relates broadly to rotary-type internal combustion engines and, more particularly, to a vane-type rotary internal combustion engine having internal, post compression magazines.

Rotary engines are engines with a working chamber whose volume is varied by revolving two or more elements with respect to one another. Rotary engines offer advantages over piston engines in that the center of gravity of the moving power output member of the reciprocating engine oscillates in a straight line while that of the rotary engine moves in one continuous circular motion. For a vehicular application, this has the advantage of smooth operation when compared to piston engines.

Modern rotary engines include a stationary housing with an internal rotor which may be moved in planetary motion within the housing. In the familiar Wankel engine, the rotor has the shape of a triangle with slightly rounded sides and rotates within a chamber formed as a "figure 8." The tips of the rotor follow the outline of the internal housing to form three working chambers which move around the housing with the rotor. As the rotor rotates, the gap between the flanks of the rotor and the wall of the housing vary cyclically, expanding and contracting to provide the four strokes of a four-cycle engine. Seals are provided at the tips of the rotor to separate the three chambers formed between the rotor and the housing.

Because each flank of the rotor acts effectively as a piston in a reciprocating engine, operation and construction of a typical rotary engine may be understood by considering only one flank of the rotor and its motion. Inlet and exhaust ports are provided at the appropriate stages and movement of the rotor carries the combustion volume over the ports.

Shaft speed in a rotary engine is typically very high but this may be achieved because of the absence of reciprocating parts. On the downside, the orbital motion of the rotor may produce out of balance loads yet these are easily counterbalanced. As will be seen, another solution to the loading due to the orbital rotor is the use of a round rotor with moving vanes. Moving vane-type rotary engines are disclosed in Kelly U.S. Pat. No. 3,452,725, Chisholm U.S. Pat. No. 3,929,105 and Hunter U.S. Pat. No. 3,951,112. In each of these patents, a round rotor is used in an eccentric rotor chamber with a plurality of vanes which are configured to move inwardly and outwardly of compartments contained within the rotors to provide the variable volume working chamber while avoiding the loads imposed by orbital rotors.

Other advantages of rotary engines include fewer moving parts, including the elimination of a valve train and as a result, the engines are typically compact.

One of the problems with rotary engines was disclosed early in their development and is caused by the shape of the combustion chamber formed between the housing and the rotor. Such a chamber is long and narrow with a large surface area for its volume which is not particularly conducive to flame propagation. These problems are exacerbated by movement of the mixture as the rotor rotates. In addition, the shape is capable of producing a high quenching action which tends to quench the flame at an early stage in the cycle resulting in dirty exhaust gases, thick with hydrocarbons.

Enhancements have been made in rotary engine design to increase combustion efficiency. Multiple inlet ports which are progressively brought into action as the power increases, direct fuel injection and the use of multiple spark plugs have enhanced combustion efficiency. Nevertheless, areas exist in rotary engine development for power enhancement as well as increased combustion efficiency.

SUMMARY OF THE INVENTION

It is accordingly an object of the present invention to provide a rotary internal combustion engine which produces enhanced power and efficiency.

It is further an object of the present invention to provide a rotary engine which provides increased power output from a sliding vane-type rotary engine.

It is another object of the present invention to provide a rotary internal combustion engine which includes a compression rotor spaced from a power rotor with a post compression magazine therebetween.

To that end, and according to the preferred embodiment of the present invention, a rotary internal combustion engine of the type having a fuel and air mixture supply and an assembly for internally igniting a fuel and air mixture from the fuel and air mixture supply to provide an explosive force for propelling at least one rotor in rotary motion includes a housing having at least two chambers formed therein with the at least two chambers defining a compression chamber and a power chamber with the chambers being interconnected for fluid communication therebetween. A fuel and air mixture reservoir is disposed intermediate the compression chamber and the power chamber. At least two rotors are included which include a compression rotor and a power rotor with the compression rotor being rotatably disposed within the compression chamber and the power rotor being rotatably disposed within the power chamber. A central shaft extends through the housing and is attached to both the compression rotor and the power rotor for simultaneous rotation therewith. A plenum chamber is provided and is disposed in the housing intermediate the power chamber and the fuel and air mixture reservoir for fluid communication therebetween. An impeller is disposed within the plenum chamber. An assembly is provided for driving the impeller synchronously with the central shall for driving the impeller at a predetermined rate relative to the rotors with the impeller forcing a fuel and air mixture from the fuel and air mixture reservoir into the power chamber for combustion therein resulting in driven rotation of the power rotor and the central shaft.

Preferably, the compression chamber and the power chamber are each formed with a generally triangular configuration having rounded corners. The present invention also includes a plurality of vanes slidably attached to at least one of the power rotor and the compression rotor for rotation therewith. The vanes extend radially outwardly from at least one rotor for sliding contact with walls defining at least one of the compression chamber and the power chamber with the vanes defining cavities of cyclically changing volume as the rotors rotate and the vanes maintain contact with the walls forming at least one of the compression chamber and the power chamber. A sealing arrangement is provided for sealing the vanes against the chamber walls as the rotors rotate and as the vanes slide and rotate to isolate the vane defined cavities from one another.

Preferably, the vanes are formed as dual-ended members disposed within cavities formed in each of the rotors with each of the ends configured for sliding wall contact, the ends being separated by a generally oval shaped aperture for extension of the central shaft therethrough with the vanes moving back and forth within the rotor cavities as the rotors rotate. Preferably, the compression chamber and the power chamber each form by a continuous wall and a generally triangular configuration having rounded corners defining a space internally of the wall. The space is characterized by its size, wherein a traverse distance taken across the space from any wall point to any other wall point and extending through the center of the chamber is equidistant with a traverse distance taken across the space from any other wall point to any other wall point and extending through the center of the chamber.

Preferably, the impeller includes a shaft having a plurality of blades projecting radially away from the shaft for sliding contact with walls forming a plenum chamber. The blades cooperate with the shaft and the walls forming the plenum chamber to define a plurality of fuel and air mixture holding cavities therebetween with each of the fuel and air mixture holding cavities containing a quantity of fuel and air mixture from the fuel and air mixture reservoir and delivering the quantity of fuel and air mixture to the power chamber intermediate the vanes as the power rotor and the impeller rotate synchronously. Preferably, the impeller includes four blades projecting from the impeller shaft at 90° intervals.

The present invention preferably further includes a valve disposed within the housing intermediate the compression chamber and the fuel and air mixture reservoir for isolation of the compression chamber from the power chamber. Preferably, this valve is a check valve mounted in the housing to provide one-way flow of the fuel and air mixture from the compression chamber to the power chamber.

It is preferred that the assembly for driving the impeller include a gear train extending between the central shaft and the impeller wherein rotation of the central shaft results in rotation of the impeller. Alternately, the central shaft may include a helical gear formed thereon and the impeller shaft may also include a helical gear formed thereon and the assembly for driving the impeller includes an impeller drive shaft extending between the impeller shaft and the central shaft with helical gears formed on each end thereof for intermeshing contact with the impeller shaft helical gear and the central shaft helical gear to transmit rotary motion of the central shaft of the impeller shaft for driving the impeller shaft synchronously with the central shaft.

By the above, the present invention provides an improved rotary internal combustion engine having enhanced fuel combustion properties and commensurately enhanced power delivery capabilities.

DETAILED DESCRIPTION OF THE PREFERRED EMBODIMENT

Figure 1:
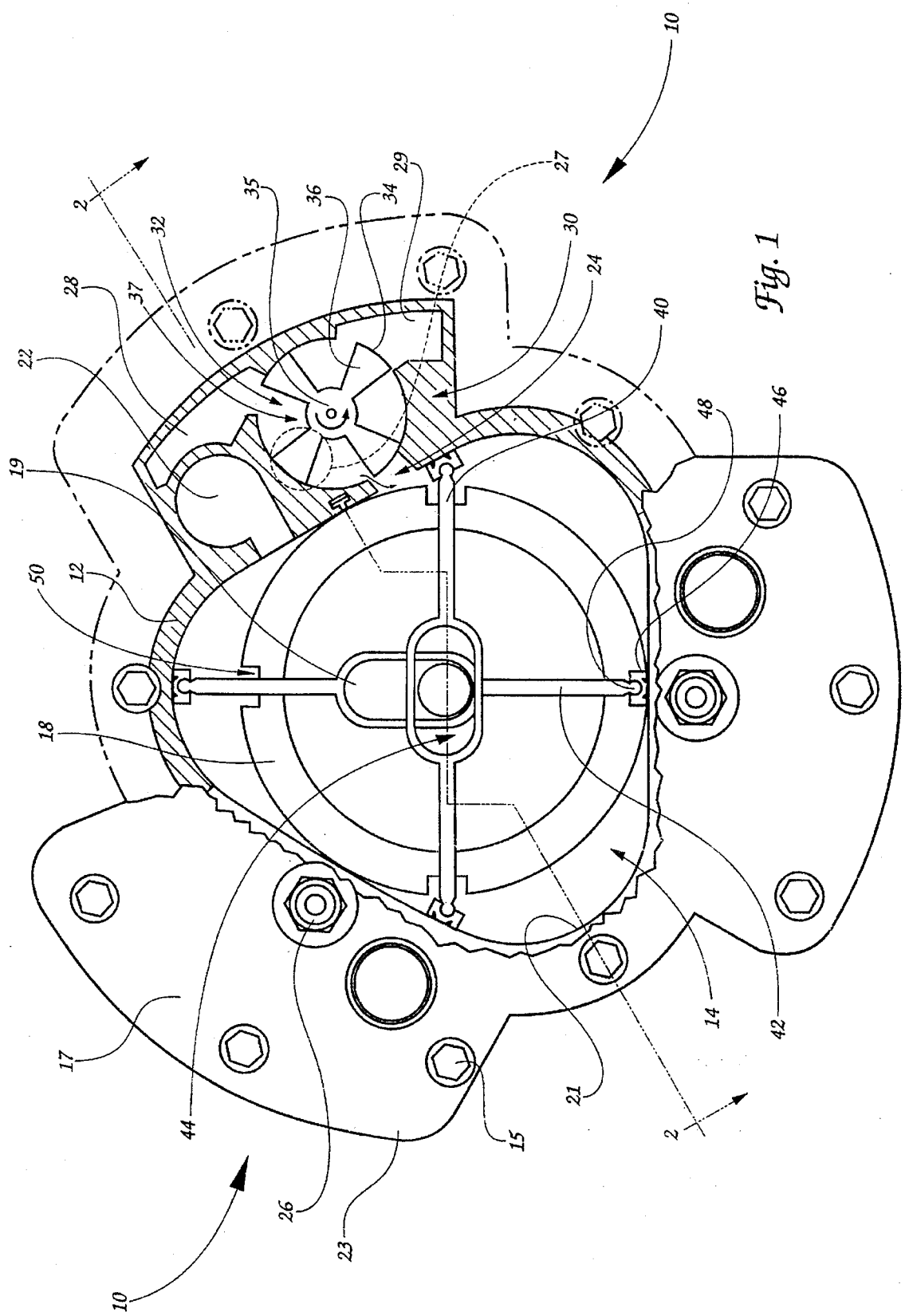
FIG. 1 is a top plan view of an improved rotary engine according to the preferred embodiment of the present invention broken open to reveal one of three magazines.

Turning now to the drawings and, more particularly, to FIG. 1, a rotary internal combustion engine according to the preferred embodiment of the present invention is illustrated generally at 10 and includes a housing 12 cast in a clover leaf-type shape with three magazine subhousings 23 projecting radially away from the central housing 12 at 120° intervals. The entire housing 12 is topped with a housing cap 17 which mimics the cross-sectional arrangement of the housing 12 and is held thereonto by conventional bolts 15. The housing 12 and the cap 17 illustrated in FIG. 1 are broken open to illustrate the rotor structure as well as the magazine structure.

Figure 2:
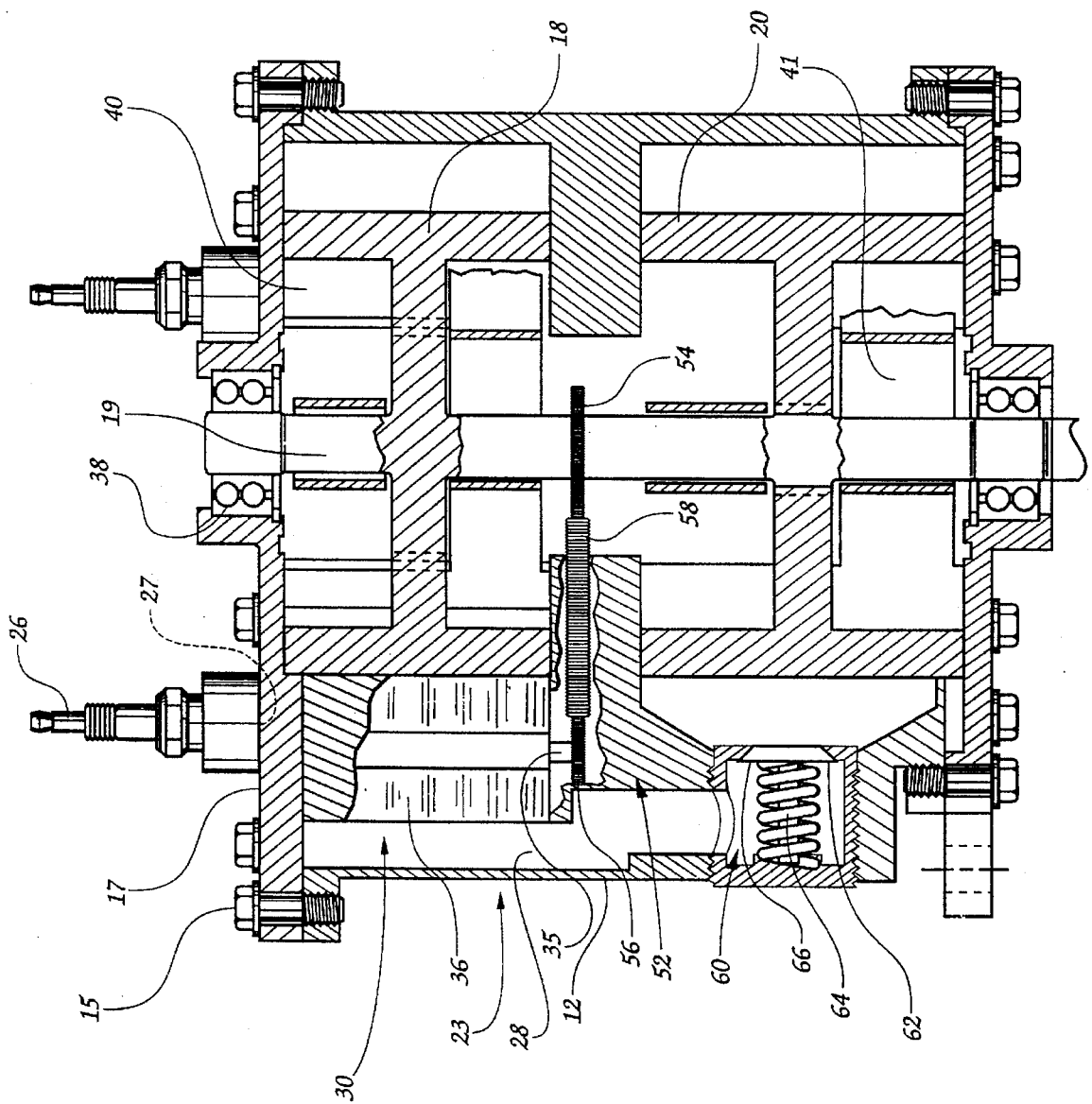
FIG. 2 is a cross-sectional view of the rotary engine depicted in FIG. 1, taken along line 2—2 thereof and broken open to reveal a first preferred embodiment of the impeller drive.
Figure 3:
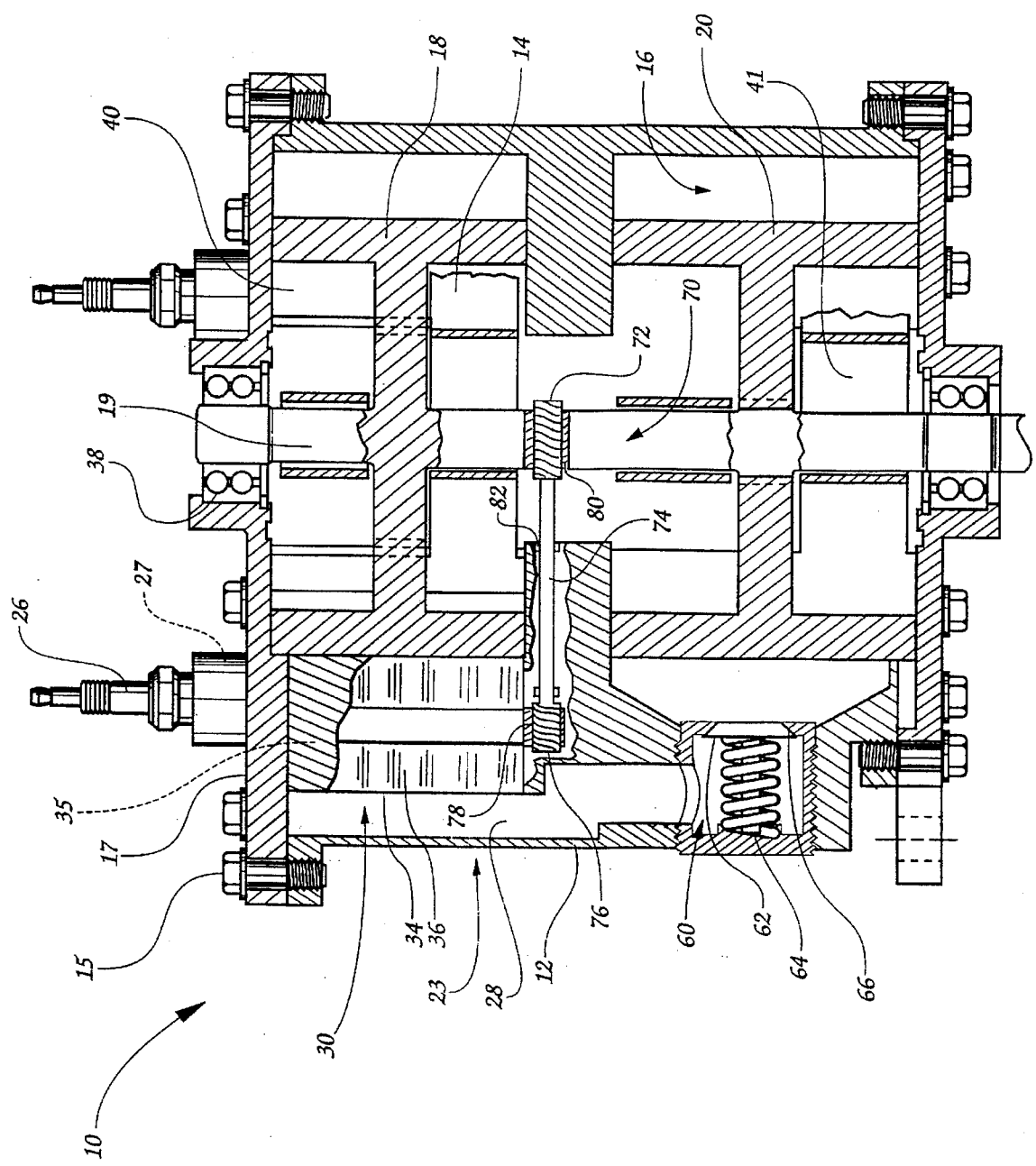
FIG. 3 is a cross-sectional view of the rotary engine depicted in FIG. 1, taken along line 2—2 thereof and broken open to reveal a second preferred embodiment of the impeller drive.
Figure 4:
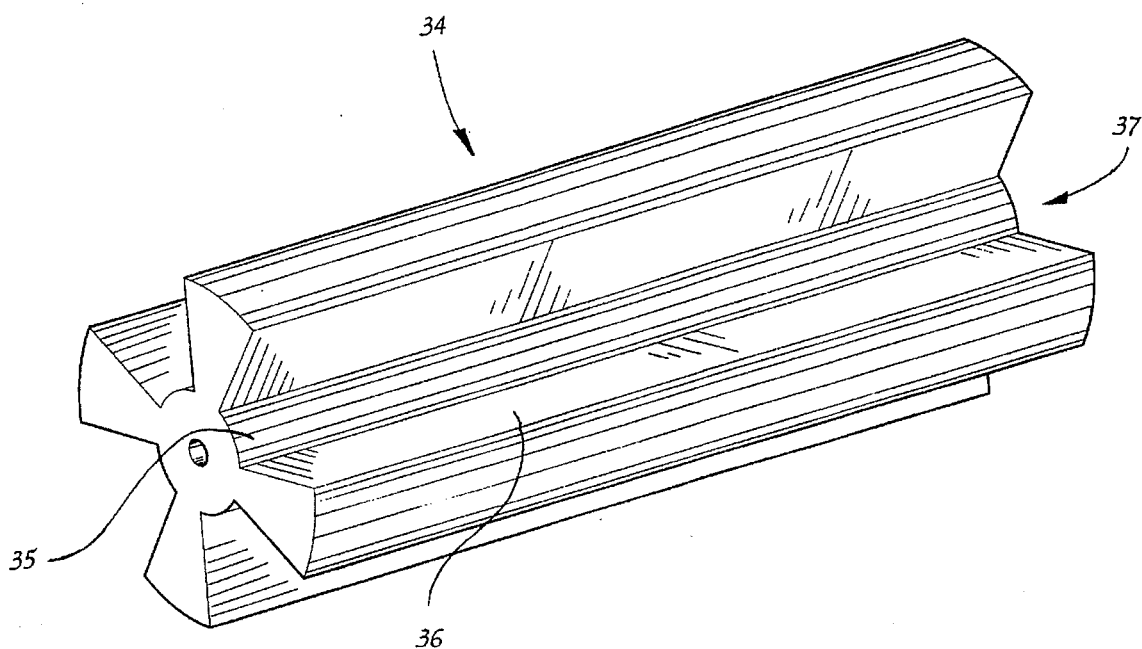
FIG. 4 is a perspective view of an impeller according to the preferred embodiment of the present invention.

As will be seen in greater detail hereinafter, the rotary engine 10 of the present invention includes at least two separate chambers, a compression chamber 16 and a power chamber 14. These chambers are best seen in FIGS. 2 and 3 while the power chamber 14 is also illustrated in FIG. 1. The power chamber 14, as well as the compression chamber 16, are formed as cylinders having a generally triangular cross-section with rounded corners. A single continuous wall 21 defines the power chamber 14 while a similar wall (not shown) defines the compression chamber 16. With continued reference to FIG. 1, a power rotor 18 is mounted to a central shaft 19 which extends through the center of the housing 12. The power rotor 18 is fixed to the shaft 19 for rotation therewith. Two vanes 40 extend through cavities 50 formed in the rotor 18 for slidable movement therein. The vanes 40 are formed as generally flat elongate members having a curved end bulb 48 on either end thereof. An elongate seal 46 which has a generally M-shaped cross-section is rockably fixed to each vane end 48. An oval aperture 44 is formed in the center of each vane 40 through which the central shaft 19 passes. The width of the oval approximates that of the central shaft while the length of the oval approximates the travel distance of the vanes as the rotor 18 rotates within the power chamber 14. A similar arrangement is provided in the compression chamber 16.

It should be noted that the power rotor 18 and the compression rotor 16 could each be formed as solid cylinders without a separate central shaft 19. Such an arrangement would eliminate the oval apertures 44 and the vanes 40 would be planar, extending uninterrupted through the cylindrical rotors. A shaft could be attached to either end of such rotors for power take off therefrom.

A unique characteristic of the power chamber 14 lies in its shape. The power chamber 14 is configured such that a line taken from any point on the chamber wall 21, through the central shaft 19 to any other point on the chamber wall 21 is equidistant with a similar measurement taken elsewhere around the perimeter of the power chamber 14. This allows the vanes 40 to be formed with a fixed, predetermined length which maintains a positive, sliding, sealing contact between the vane seal 48 and the chamber wall 21. Three spark plugs 26 are provided at 120° intervals which project downwardly into firing chambers (not shown) for combustion of a fuel and air mixture to drive the engine.

As seen in FIGS. 2 and 3, the rotary engine 10 of the present invention includes a compression chamber 16 which includes a compression rotor 18 as well as compression vanes 41 which essentially duplicates the power rotor configuration described above. The intake of a fuel and air mixture from a carburetor or fuel injection system (not shown) enters the compression chamber 16 where it is compressed into a pressurized gas for delivery to the magazine 30. Combustion occurs in the combustion chamber 27 adjacent the magazine 30 where flame propagation and explosive force delivery to the vanes 40 is enhanced by action of the impeller 34 within the magazine 31. The magazine 30 thereby helps to compensate for the flame propagation deficiencies of conventional rotary engines.

As seen in FIGS. 1, 2 and 3, a magazine 30 is provided for post compression ignition and control of the resulting explosion of a fuel and air mixture. It should be noted that the following discussion applying to transfer of a compressed fuel and air mixture from the compression chamber 16 to the power chamber 14 is focused on a single magazine subhousing 23. As previously stated, there are three magazine subhousings 23, three spark plugs, and, consequently, three magazine systems associated with the present invention. For expediency, only one magazine housing 23 and its associated magazine mechanism will be discussed.

Intermediate the compression chamber 16 and the power chamber 14, a fuel and air mixture reservoir 28 is disposed providing a fluid communication link therebetween. The fuel and air mixture reservoir 28 is an eccentrically shaped cavity formed in the magazine subhousing 23 which is generally elongate and of an irregular cross-section. Its function is to provide a reservoir for a precompressed mixture of fuel and air which can be drawn off by the action of the impeller 34, as will be explained in greater detail hereinafter. A purge chamber 29 is formed as an elongate slot in the housing 12 and is disposed oppositely from the reservoir 28 at a position after the inlet 24 to the power chamber 14 proceeding counterclockwise around the plenum chamber 37. The purge chamber 29 removes hot gases remaining in the magazine, thereby reducing the likelihood of detonation or backfire.

A check valve 60 is disposed intermediate the fuel and air reservoir 28 and the compression chamber 16. This check valve 60 is directed inwardly toward the compression chamber 16 and includes a valve member 66 biased by a valve spring 64 onto a valve seat 62 formed in the subhousing 23. This valve 60 is normally closed and is open by internal pressure from the rotating compression rotor 24 driving compressed fuel and air against the valve member 66. Once this pressure exceeds the biasing force exerted by the spring 64, the valve 60 opens and allows a volume of fuel and air to pass thereacross. It is reasonably foreseen that this valve will oscillate rapidly during operation and its primary function is to prevent backflow from the fuel and air mixture reservoir 28 into the compression chamber 16 as well as to isolate the fuel and air reservoir 28 to ensure that the magazine 30 draws a proper amount of fuel and air from the fuel and air mixture reservoir 28.

The magazine 30 is best seen in FIGS. 1, 2 and 3. The magazine 30 consists of an impeller 34 having a central shaft 35 and four blades 36 projecting outwardly at 90° intervals therearound. The blades 36 have a tapered configuration and are wider at the distal end than at their stem. Cavities 37 are defined intermediate the blades for receiving a slug of fuel and air mixture from the fuel and air reservoir 28. The impeller 34 is disposed within a plenum chamber 32 for rotation therein in a direction according to the arrow shown thereon. It should be noted that the impeller could be formed with two blades, three blades or any number of blades depending upon timing requirements or other design factors involving, and that the present invention is not restricted to the use of four blades.

The impeller 34 is driven by rotation of the central shaft 19 through any number of drive arrangements. As seen in FIG. 1, an intake port 24 is provided adjacent the magazine 30 to provide a gateway into the power chamber 14. The intake port 24 is an elongate slot intermediate the magazine chamber 32 and the power chamber 14. The exhaust port 22 is another elongate slot which is disposed adjacent the magazine 30 to remove exhaust gases from the previous combustion site. As may be appreciated, each exhaust port 22 formed in each magazine subchamber 23 receives exhaust gases from the immediately prior combustion event.

As may be appreciated, the rotary movement of the impeller 34 is synchronized to movement of the power rotor 18 so that a proper volume of fuel and air mixture may be available at the precise moment needed for combustion. To that end, two separate drive systems are illustrated in FIGS. 2 and 3 respectively. While these two drive systems are illustrative of ways in which the central shaft 19 may be used to drive the impeller 34 synchronously with the rotors 16, 18, these examples are by no means exhaustive and other known drive methods may be employed to achieve the same result without departing from the spirit and scope of the present invention. With reference to FIG. 2, a gear drive is shown generally at 52 and includes a pinion gear 54 mounted to the central shaft 19 for rotation therewith. A similar pinion gear 56 is mounted to the impeller shaft 35 for rotation therewith in general alignment with the central shaft gear 54. An intermediate, idler gear 58 is disposed in between the central shaft gear 54 and the impeller shaft gear 56 to transmit rotary motion of the central shaft 19 to the impeller shaft 56. It should be noted that the choice of gearing is up to the individual and is constrained by timing requirements which dictate gear ratios and space availability which dictates gear diameter such that a plurality of small diameter gears may be used to achieve the same result as the larger gear shown in FIG. 2.

An alternate system is shown in FIG. 3. There, the central shaft 19 has a helical gear 80 formed thereon. A similar helical gear 78 is formed on the impeller shaft 35. A drive shaft 74 is mounted to bearings 82 for rotation therein and extends between the central shaft 19 and the impeller shaft 35. A helical gear 72 is mounted to one end of the drive shaft 74 and is mounted thereto in an intermeshing relationship with the helical gear 80 formed on the central shaft 19. A similar helical gear 76 is disposed on the other end of the drive shaft 74 for intermeshing with the helical gear 78 which is mounted to the impeller shaft 35. The gear ratios are once again chosen based on timing. Rotation of the central shaft 19 causes rotation of the integrally formed helical gear 80 which through intermeshing contact with the helical gear 72 formed on the drive shaft 74 causes rotation of the drive shaft 74. This in turn causes rotation of the other helical gear 76 which causes rotation of the impeller shaft 35 through helical gear 78 attached thereto. Through careful choice of gear ratios, the timing of the impeller 34 rotation may be coordinated with rotation of the rotors 18, 20.

In operation, a fuel and air mixture is received from a carburator or fuel injection system (not shown) and is deposited in the compression chamber 16. Rotation of the compression rotor 20 causes the compression vanes 41 to rotate and track the wails of the compression chamber 16. This causes compression of the mixture and, when the mixture is driven into the valve 60, the valve 60 unseats and delivers the volume of fuel and air into the fuel and air mixture reservoir 28. The reservoir fills with pressurized fuel and air which is available at the magazine 30 through the intake slot 32. Synchronous rotation of the magazine impeller 34 with the rotors 18, 20 causes the blades 36 to sweep a predetermined amount of fuel and air mixture into the cavity 37 between the blades 36 which is delivered into the intake port 24 for receipt in the power chamber 14. As the impeller 34 sweeps under the combustion chamber 27, a spark plug 26 is caused to discharge which ignites the fuel air mixture in the combustion chamber 27 and the resulting explosion as well as action by the impeller 34 drives the vane 40 through a portion of the cycle thereby driving the power rotor 18 into rotation and simultaneously causing the central shaft 19 to rotate. The central shaft 19 may then be tapped for power to drive a drive shaft, chain or other power transmission mechanism. The vane 40 sweeps around its track depositing the spent exhaust gas at the nearest exhaust port 22 which is in the next approaching magazine subhousing 23. Since there are three magazine subhousings 23 and, consequently, three spark plugs 26, three explosive power generation events occur to continuously drive the power rotor 18 in rotation.

By applying a supercharged volume of fuel and air mixture into the power chamber 14, performance of the rotary internal combustion engine of the present invention is thereby enhanced and a more complete burning of the fuel may then occur. By the above, the present invention provides a compact rotary engine having enhanced power delivery capabilities.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A rotary internal combustion engine of the type having a fuel and air mixture supply, and means for internally igniting a fuel and air mixture from said fuel and air mixture supply to provide an explosive force for propelling at least one rotor in rotary motion, said rotary internal combustion engine comprising:

a housing having at least two chambers formed therein, said at least two chambers defining a compression chamber and a power chamber, said chambers being interconnected for fluid communication therebetween;

a fuel and air mixture reservoir disposed intermediate said compression chamber and said power chamber;

at least two rotors including a compression rotor and a power rotor with said compression rotor being rotatably disposed within said compression chamber and said power rotor being rotatably disposed within said power chamber;

a central shaft extending through said housing and attached to both said compression rotor and said power rotor for simultaneous rotation therewith;

a plenum chamber disposed in said housing intermediate said power chamber and said fuel and air mixture reservoir for fluid communication therebetween;

an impeller rotatably disposed within said plenum chamber;

means for driving said impeller synchronously with said central shaft for driving said impeller at a predetermined rate relative to said rotors, said impeller forcing a fuel and air mixture from said fuel and air mixture reservoir into said power chamber for explosive expansion therein resulting in driven rotation of said power rotor and said central shaft.

2. A rotary internal combustion engine according to claim 1 wherein said compression chamber and said power chamber are formed in a generally triangular configuration having rounded corners.

3. A rotary internal combustion engine according to claim 2 and further comprising a plurality of vanes slidably attached to at least one of said power rotor and said compression rotor for rotation therewith, said vanes extending radially outwardly from said at least one rotor for sliding contact with walls defining at least one of said compression chamber and said power chamber, said vanes defining cavities of continually changing volume as said rotors rotate and said vanes maintain contact with said walls forming said at least one of said compression chamber and said power chamber.

4. A rotary internal combustion engine according to claim 3 and further comprising means for sealing said vanes against said chamber walls as said rotors rotate and as said vanes slide and rotate to isolate said vane defined cavities from one another.

5. A rotary internal combustion engine according to claim 4 wherein said vanes are formed as dual ended members disposed within cavities formed in each said rotor with each said end configured for sliding wall contact, said ends being separated by a generally oval shaped aperture for extension of said central shaft therethrough with said vanes moving back and forth within said rotor cavities as said rotors rotate.

6. A rotary internal combustion engine according to claim 2 wherein said compression chamber and said power chamber are each formed by a continuous wall in a generally triangular configuration having rounded corners defining a space internally of said wall, wherein a traverse distance taken across said space from any wall point to any other wall point and extending through the center of the chamber is equidistant with a traverse distance taken across said space from any other wall point to any other wall point and extending through the center of the chamber.

7. A rotary internal combustion engine according to claim 1 wherein said impeller includes a shaft having a plurality of blades projecting radially away from said shaft for sliding contact with walls forming said plenum chamber, said blades cooperating with said shaft and said walls forming said plenum chamber to define a plurality of fuel and air mixture holding cavities therebetween with each said fuel and air mixture holding cavity obtaining a quantity of fuel and air mixture from said fuel and air mixture reservoir and delivering said quantity of fuel and air mixture to said power chamber intermediate said vanes as said power rotor and said impeller rotate synchronously.

8. A rotary internal combustion engine according to claim 7 wherein said impeller includes four blades projecting from said impeller shaft at ninety degree intervals.

9. A rotary internal combustion engine according to claim 1 and further comprising a valve disposed within said housing intermediate said compression chamber and said fuel and air mixture reservoir for isolation of said compression chamber from said power chamber.

10. A rotary internal combustion engine according to claim 9 wherein said valve is a check valve mounted in said housing to provide one way flow of said fuel and air mixture from said compression chamber to said power chamber.

11. A rotary internal combustion engine according to claim 1 wherein said means for driving said impeller includes a gear train extending between said central shaft and said impeller wherein rotation of said central shaft results in rotation of said impeller.

12. A rotary internal combustion engine according to claim 1 wherein said central shaft includes a helical gear formed thereon and said impeller shaft includes a helical gear formed thereon and said means for driving said impeller includes an impeller drive shaft extending between said impeller shaft and said central shaft with helical gears formed on each end thereof for intermeshing contact with said impeller shaft helical gear and said central shaft helical gear to transmit rotary motion of said central shaft to said impeller shaft for driving said impeller shaft synchronously with said central shaft.

13. A rotary internal combustion engine of the type having a fuel and air mixture supply, and means for internally igniting a fuel and air mixture from said fuel and air mixture supply to provide an explosive force for propelling at least one rotor in rotary motion, said rotary internal combustion engine comprising:

a housing having at least two chambers formed therein, said at least two chambers defining a compression chamber and a power chamber, said compression chamber and said power chamber being formed in a generally triangular configuration having rounded corners and being interconnected for fluid communication therebetween;

a fuel and air mixture reservoir disposed intermediate said compression chamber and said power chamber;

at least two rotors including a compression rotor and a power rotor with said compression rotor being rotatably disposed within said compression chamber and said power rotor being rotatably disposed within said power chamber;

a plurality of vanes slidably attached to at least one of said power rotor and said compression rotor for rotation therewith, said vanes extending radially outwardly from said at least one rotor for sliding contact with walls defining at least one of said compression chamber and said power chamber, said vanes defining cavities of cyclically changing volume as said rotors rotate and said vanes maintain contact with said walls forming said at least one of said compression chamber and said power chamber;

means for sealing said vanes against said chamber walls as said rotors rotate and as said vanes slide and rotate to isolate said vane defined cavities from one another;

a central shaft extending through said housing and attached to both said compression rotor and said power rotor for simultaneous rotation therewith;

a check valve mounted in said housing to provide one way flow of said fuel and air mixture from said compression chamber to said power chamber;

a plenum chamber disposed in said housing intermediate said power chamber and said fuel and air mixture reservoir for fluid communication therebetween;

an impeller rotatably disposed within said plenum chamber and including a shaft having a plurality of blades projecting radially away from said shaft for sliding contact with walls forming said plenum chamber, said blades cooperating with said shaft and said walls forming said plenum chamber to define a plurality of fuel and air mixture holding cavities therebetween with each said fuel and air mixture holding cavity obtaining a quantity of fuel and air mixture from said fuel and air mixture reservoir and delivering said quantity of fuel and air mixture to said power chamber intermediate said vanes as said power rotor and said impeller rotate synchronously; and means for driving said impeller synchronously with said central shaft for driving said impeller at a predetermined rate relative to said rotors, said impeller forcing a fuel and air mixture from said fuel and air mixture reservoir into said power chamber for combustion therein resulting in driven rotation of said power rotor and said central shaft.

14. A rotary internal combustion engine according to claim 13 wherein said means for driving said impeller includes a gear train extending between said central shaft and said impeller wherein rotation of said central shaft results in rotation of said impeller.

15. A rotary internal combustion engine according to claim 13 wherein said central shaft includes a helical gear formed thereon and said impeller shaft includes a helical gear formed thereon and said means for driving said impeller includes an impeller drive shaft extending between said impeller shaft and said central shaft with helical gears formed on each end thereof for intermeshing contact with said impeller shaft helical gear and said central shaft helical gear to transmit rotary motion of said central shaft to said impeller shaft for driving said impeller shaft synchronously with said central shaft.

16. A rotary internal combustion engine according to claim 13 wherein said impeller includes four blades projecting from said impeller shaft at ninety degree intervals.

17. In a rotary internal combustion engine of the type having a fuel and air mixture supply, and means for internally igniting a fuel and air mixture from said fuel and air mixture supply to provide an explosive force for propelling at least one rotor in rotary motion, a plurality of vanes slidably attached to at least one rotor for rotation therewith, said vanes extending radially outwardly from the rotor for sliding contact with walls defining at least one chamber, said vanes defining cavities of cyclically changing volume as the rotor rotates and said vanes maintain contact with said walls forming the chamber, the improvement comprising:

a housing having at least two chambers formed therein, said at least two chambers defining a compression chamber and a power chamber, said compression chamber and said power chamber being formed in a generally triangular configuration having rounded corners and being interconnected for fluid communication therebetween;

a fuel and air mixture reservoir disposed intermediate said compression chamber and said power chamber;

at least two rotors including a compression rotor and a power rotor with said compression rotor being rotatably disposed within said compression chamber and said power rotor being rotatably disposed within said power chamber;

a central shaft extending through said housing and attached to both said compression rotor and said power rotor for simultaneous rotation therewith;

a plenum chamber disposed in said housing intermediate said power chamber and said fuel and air mixture reservoir for fluid communication therebetween;

an impeller rotatably disposed within said plenum chamber and including a shaft having a plurality of blades projecting radially away from said shaft for sliding contact with walls forming said plenum chamber, said blades cooperating with said shaft and said walls forming said plenum chamber to define a plurality of fuel and air mixture holding cavities therebetween with each said fuel and air mixture holding cavity obtaining a quantity of fuel and air mixture from said fuel and air mixture reservoir and delivering said quantity of fuel and air mixture to said power chamber intermediate the vanes as said power rotor and said impeller rotate synchronously; and means for driving said impeller synchronously with said central shaft for driving said impeller at a predetermined rate relative to said rotors, said impeller forcing a fuel and air mixture from said fuel and air mixture reservoir into said power chamber for combustion therein resulting in driven rotation of said power rotor and said central shaft.

18. An improved rotary internal combustion engine according to claim 17 and further comprising a check valve mounted in said housing to provide one way flow of said fuel and air mixture from said compression chamber to said power chamber.

19. An improved rotary internal combustion engine according to claim 17 wherein said means for driving said impeller includes a gear train extending between said central shaft and said impeller wherein rotation of said central shaft results in rotation of said impeller.

20. An improved rotary internal combustion engine according to claim 17 wherein said central shaft includes a helical gear formed thereon and said impeller shaft includes a helical gear formed thereon and said means for driving said impeller includes an impeller drive shaft extending between said impeller shaft and said central shaft with helical gears formed on each end thereof for intermeshing contact with said impeller shaft helical gear and said central shaft helical gear to transmit rotary motion of said central shaft to said impeller shaft for driving said impeller shaft synchronously with said central shaft.

21. An improved rotary internal combustion engine according to claim 17 wherein said impeller includes four blades projecting from said impeller shaft at ninety degree intervals.

22. A rotary internal combustion engine of the type having a fuel and air mixture supply, and means for internally igniting a fuel and air mixture from said fuel and air mixture supply to provide an explosive force for propelling at least one rotor in rotary motion, said rotary internal combustion engine comprising:

a housing having at least two chambers formed therein, said at least two chambers defining a compression chamber and a power chamber, said chambers being interconnected for fluid communication therebetween, said compression chamber and said power chamber each being formed by a continuous wall in a generally triangular configuration having rounded corners defining a space internally of said wall, wherein a traverse distance taken across said space from any wall point to any other wall point and extending through the center of the chamber is equidistant with a traverse distance taken across said space from any other wall point to any other wall point and extending through the center of the chamber;

at least two rotors including a compression rotor and a power rotor with said compression rotor being rotatably disposed within said compression chamber and said power rotor being rotatably disposed within said power chamber;

at least one shaft attached to one of said compression rotor and said power rotor for simultaneous powered rotation therewith.

23. A rotary internal combustion engine according to claim 23 and further comprising a fuel and air mixture reservoir disposed intermediate said compression chamber and said power chamber; a plenum chamber disposed in said housing intermediate said power chamber and said fuel and air mixture reservoir for fluid communication therebetween; an impeller rotatably disposed within said plenum chamber; means for driving said impeller synchronously with said central shaft for driving said impeller at a predetermined rate relative to said rotors, said impeller forcing a fuel and air mixture from said fuel and air mixture reservoir into said power chamber for combustion therein resulting in driven rotation of said power rotor and said central shaft.

* * * * *